United States Patent
Bradish et al.

(10) Patent No.: US 9,749,813 B2
(45) Date of Patent: Aug. 29, 2017

(54) SYSTEM AND METHOD FOR ASSOCIATING A MAC ADDRESS OF A WIRELESS STATION WITH PERSONAL IDENTIFYING INFORMATION OF A USER OF THE WIRELESS STATION

(71) Applicant: RADIUS NETWORKS, INC., Washington, DC (US)

(72) Inventors: Stillman Bradish, New York, NY (US); Scott A. Smith, Delray Beach, FL (US); Marc Wallace, Arlington, VA (US)

(73) Assignee: RADIUS NETWORKS, INC., Washington, DC (US)

( * ) Notice: Subject to any disclaimer, the term of this patent is extended or adjusted under 35 U.S.C. 154(b) by 0 days.

(21) Appl. No.: 14/108,578

(22) Filed: Dec. 17, 2013

(65) Prior Publication Data

US 2014/0169256 A1 Jun. 19, 2014

Related U.S. Application Data

(60) Provisional application No. 61/738,114, filed on Dec. 17, 2012.

(51) Int. Cl.
*H04W 4/06* (2009.01)
(52) U.S. Cl.
CPC ..................................... *H04W 4/06* (2013.01)
(58) Field of Classification Search
CPC ..... H04L 67/18; H04L 2209/60; H04L 9/083; H04L 2463/062; H04L 63/061; H04N 1/00281; H04N 2201/3205; H04N 2201/3226; H04N 2201/3253; H04W 4/02; H04W 4/185; H04W 12/02; H04W 4/06; B21H 5/027

See application file for complete search history.

(56) References Cited

U.S. PATENT DOCUMENTS

| | | | | |
|---|---|---|---|---|
| 5,873,086 | A * | 2/1999 | Fujii | G06F 17/30067 |
| 6,915,278 | B1 * | 7/2005 | Ferrante | G06F 21/105 |
| | | | | 380/201 |
| 7,043,473 | B1 * | 5/2006 | Rassool | G06F 17/30743 |
| 2002/0022483 | A1 | 2/2002 | Thompson et al. | |
| 2002/0042884 | A1 * | 4/2002 | Wu | G06F 21/645 |
| | | | | 726/10 |
| 2002/0156862 | A1 * | 10/2002 | Zhou | G06F 17/30867 |
| | | | | 709/217 |

(Continued)

FOREIGN PATENT DOCUMENTS

WO 2006/110181 10/2006

OTHER PUBLICATIONS

Search report from P.C.T., mail date is Apr. 9, 2014.

(Continued)

*Primary Examiner* — Dung B Huynh
(74) *Attorney, Agent, or Firm* — Vierra Magen Marcus LLP

(57) ABSTRACT

A wireless station receives a message broadcast by a string broadcast station, which message includes a network information string. The wireless station generates an identifier comprising a tag component and a content component and sends the identifier and the network information string to a datastore. The identifier is stored in association with the network information string in the datastore.

19 Claims, 11 Drawing Sheets

(56) References Cited

U.S. PATENT DOCUMENTS

| | | | |
|---|---|---|---|
| 2003/0101454 A1* | 5/2003 | Ozer | G06Q 30/02 725/42 |
| 2004/0003060 A1* | 1/2004 | Asoh et al. | 709/220 |
| 2004/0064591 A1 | 4/2004 | Noble | |
| 2004/0122822 A1* | 6/2004 | Thompson | G06Q 10/10 |
| 2004/0176101 A1* | 9/2004 | Shoki et al. | 455/456.1 |
| 2004/0267873 A1* | 12/2004 | Shen | H04L 29/06 709/200 |
| 2005/0044415 A1* | 2/2005 | Yook | H04L 63/104 726/4 |
| 2005/0059416 A1* | 3/2005 | Ono | 455/457 |
| 2005/0183115 A1* | 8/2005 | Maruyama et al. | 725/38 |
| 2005/0286456 A1* | 12/2005 | McNew et al. | 370/312 |
| 2006/0072760 A1* | 4/2006 | Gates | 380/270 |
| 2006/0095540 A1* | 5/2006 | Anderson et al. | 709/217 |
| 2006/0265737 A1* | 11/2006 | Morris | 726/3 |
| 2006/0268767 A1* | 11/2006 | Sato et al. | 370/328 |
| 2007/0022055 A1* | 1/2007 | Eliason | G06F 21/10 705/51 |
| 2007/0064644 A1* | 3/2007 | Dowling et al. | 370/328 |
| 2007/0086353 A1* | 4/2007 | Gefflaut | H04L 1/002 370/252 |
| 2007/0264974 A1* | 11/2007 | Frank | H04L 63/0407 455/411 |
| 2007/0300271 A1* | 12/2007 | Allen | H04N 5/232 725/93 |
| 2008/0119200 A1* | 5/2008 | McConnell | 455/456.1 |
| 2008/0132170 A1* | 6/2008 | Alizadeh-Shabdiz et al. | 455/41.2 |
| 2008/0132179 A1* | 6/2008 | Takeshita et al. | 455/77 |
| 2008/0133336 A1* | 6/2008 | Altman | G06Q 30/0207 455/456.1 |
| 2008/0159499 A1* | 7/2008 | Cai | 379/114.01 |
| 2008/0227467 A1* | 9/2008 | Barnes et al. | 455/456.2 |
| 2008/0253302 A1* | 10/2008 | Nago | H04W 8/005 370/254 |
| 2008/0288423 A1* | 11/2008 | Eastman | G06Q 30/0283 705/418 |
| 2008/0304458 A1* | 12/2008 | Aghvami et al. | 370/338 |
| 2009/0005032 A1* | 1/2009 | Lunati et al. | 455/426.1 |
| 2009/0085806 A1 | 4/2009 | Piersol et al. | |
| 2009/0158400 A1* | 6/2009 | Miyake | G06F 21/6218 726/4 |
| 2009/0164271 A1* | 6/2009 | Johnson | G06Q 20/123 705/344 |
| 2009/0234738 A1* | 9/2009 | Britton | G06Q 30/0252 705/14.5 |
| 2009/0234857 A1* | 9/2009 | Barault et al. | 707/9 |
| 2009/0323659 A1* | 12/2009 | Zhang | 370/338 |
| 2010/0017525 A1* | 1/2010 | Albert | H04L 43/0811 709/229 |
| 2010/0020186 A1* | 1/2010 | Matsui | 348/211.2 |
| 2010/0080202 A1* | 4/2010 | Hanson | H04L 63/0853 370/338 |
| 2010/0097986 A1* | 4/2010 | Ylitalo et al. | 370/328 |
| 2010/0112975 A1* | 5/2010 | Sennett et al. | 455/404.1 |
| 2010/0115262 A1* | 5/2010 | Suyama et al. | 713/150 |
| 2010/0232405 A1* | 9/2010 | Kikuchi | H04W 4/001 370/338 |
| 2010/0246522 A1* | 9/2010 | Hirose | 370/329 |
| 2011/0051787 A1* | 3/2011 | Warren | H04H 60/13 375/224 |
| 2011/0070863 A1* | 3/2011 | Ma et al. | 455/410 |
| 2011/0178863 A1* | 7/2011 | Daigle | 705/14.31 |
| 2011/0207440 A1* | 8/2011 | Ruuspakka | H04W 4/08 455/414.1 |
| 2011/0219226 A1* | 9/2011 | Olsson et al. | 713/150 |
| 2011/0249622 A1* | 10/2011 | Takeda et al. | 370/328 |
| 2011/0276563 A1* | 11/2011 | Sandoval | H04L 63/102 707/723 |
| 2011/0289193 A1* | 11/2011 | Kim | H04W 8/005 709/219 |
| 2012/0040653 A1* | 2/2012 | Mendis | G01S 5/0252 455/414.2 |
| 2012/0047011 A1* | 2/2012 | Rippetoe | G06Q 30/02 705/14.45 |
| 2012/0106449 A1* | 5/2012 | Shibuya | 370/328 |
| 2012/0115512 A1* | 5/2012 | Grainger | G01S 5/0257 455/456.3 |
| 2012/0173411 A1* | 7/2012 | Ko | G06Q 20/10 705/39 |
| 2012/0290834 A1* | 11/2012 | Yamaguchi et al. | 713/156 |
| 2012/0294234 A1* | 11/2012 | Bradish | H04W 4/04 370/328 |
| 2012/0295569 A1* | 11/2012 | Bradish et al. | 455/404.1 |
| 2013/0023284 A1* | 1/2013 | Stanger | G06Q 30/0259 455/456.1 |
| 2013/0045758 A1* | 2/2013 | Khorashadi | H04W 4/001 455/456.3 |
| 2013/0080578 A1* | 3/2013 | Murad | H04N 21/214 709/217 |
| 2013/0128811 A1* | 5/2013 | Bradish et al. | 370/328 |
| 2013/0226914 A1* | 8/2013 | Kurabayashi | G06F 17/30115 707/723 |
| 2013/0231088 A1* | 9/2013 | Jabara et al. | 455/411 |
| 2013/0254172 A1* | 9/2013 | Watanabe | G06F 21/6218 707/694 |

OTHER PUBLICATIONS

International Preliminary Report on Patentability dated Jul. 2, 2015 in International Patent Application No. PCT/US2013/075712, 5 pages.

* cited by examiner

SYSTEM AND METHOD FOR ASSOCIATING A MAC ADDRESS OF A WIRELESS STATION WITH PERSONAL IDENTIFYING INFORMATION OF A USER OF THE WIRELESS STATION

CLAIM FOR PRIORITY

This application claims the priority benefit of U.S. provisional application 61/738,114, filed Dec. 17, 2012, the contents of which is expressly incorporated by reference herein in its entirety.

BACKGROUND

Wireless networks are used by consumers, businesses, service organizations (among others) to establish or extend local area networks to locations that are not readily or desirably connected to wire network interface cards.

Networks may be operated so as to restrict access to authorized users. Alternatively, a wireless network may be open to access to anyone, either for a fee or without charge. For example, open networks or "hot spots" are often operated by retail establishments, transportation hubs, medical facilities, and educational institutions to permit access to the Internet to users of wireless stations, such as laptops, smartphones, and tablets, through a base station or access point (AP).

A wireless network typically communicates using a protocol that defines message structures (sometimes referred to herein as "frames"). A message frame may include a field for a network identifier or name, the media access controller address (MAC) of the station from which the frame is broadcast, and other information. In order to connect to a network, a wireless station must first find a compatible network that is within range of its transceiver. This process is typically accomplished through either passive or active scanning. In passive scanning, an AP broadcasts its network name and other information in a message frame. In active scanning, the wireless station requests a response from an access point by broadcasting the network ID of the network it is seeking to join. Alternatively, an active scanning process may include broadcasting a request for a response from any network within range of the wireless station. The APs that are within range broadcast their SSIDs to the wireless station. The wireless station may select a wireless AP to associate with from the list of responders.

Another architecture allows wireless stations to announce their presence to other wireless stations and to form networks in which there is no AP. In this case, the wireless station seeking other wireless stations broadcasts its network identifier and receives a response from other wireless stations within range.

Once a compatible network is found, the wireless station establishes a connection to a wireless network through an exchange of messages that authenticates the wireless station to an access point (or a wireless station when there is no AP present) and then associates the wireless station with that access point or wireless station. By way of illustration and not by way of limitation, an IEEE 802.11 network (or more commonly, "Wi-Fi" network) provides communications between a Wi-Fi AP and Wi-Fi enabled device. The Wi-Fi AP transmits the network name in the form of a service set identifier (SSID). The SSID is typically a 1 to 32 byte value that segments the airwaves for usage. If two wireless networks are physically close, the SSIDs label the respective networks, and allow the components of one network to ignore those of the other. The SSID is present in beacon messages sent by an AP, a probe request sent by a wireless station, probe responses sent by an AP, an association request sent by a probe request sent by a wireless station, and a re-association request sent by a wireless station. When wireless stations are operated without an access device (IBSS or ad-hoc mode), probe requests from one wireless station may be answered by another wireless station with a probe response.

A beacon message is sent by an AP 5 to 20 times per second. The beacon typically includes the SSID, the time, capabilities, supported data rates, and physical layer parameter sets that regulate the smooth operation of a wireless network.

The information that is broadcast by an AP may be received freely by any device that operates a compatible receiver. Unless the device intends to connect to the network supported by the AP, the information that is broadcast by the AP is simply ignored.

SUMMARY

Embodiments are directed to utilizing the information broadcast by a string broadcast station (SBS) to identify a physical location to which other information may be pinned. The pinned information may be used by applications to take an action or to inform users of those applications about additional information that may be associated with or derived from the pinned information.

As used herein, a string broadcast station encompasses a device that is capable of broadcasting a beacon message that contains a network information string.

A "string" encompasses a series of alpha-numeric characters. For example, the network information string may be all or part of a network identifier, for example, the service set identifier (SSID) of a Wi-Fi network. In another embodiment, the network information string may be the MAC address of the SBS that broadcasts the beacon message.

The MAC address may be used as the network information string either alone or in combination with the network identifier.

A network information string may be registered with an information string server.

DETAILED DESCRIPTION

Figure 1:
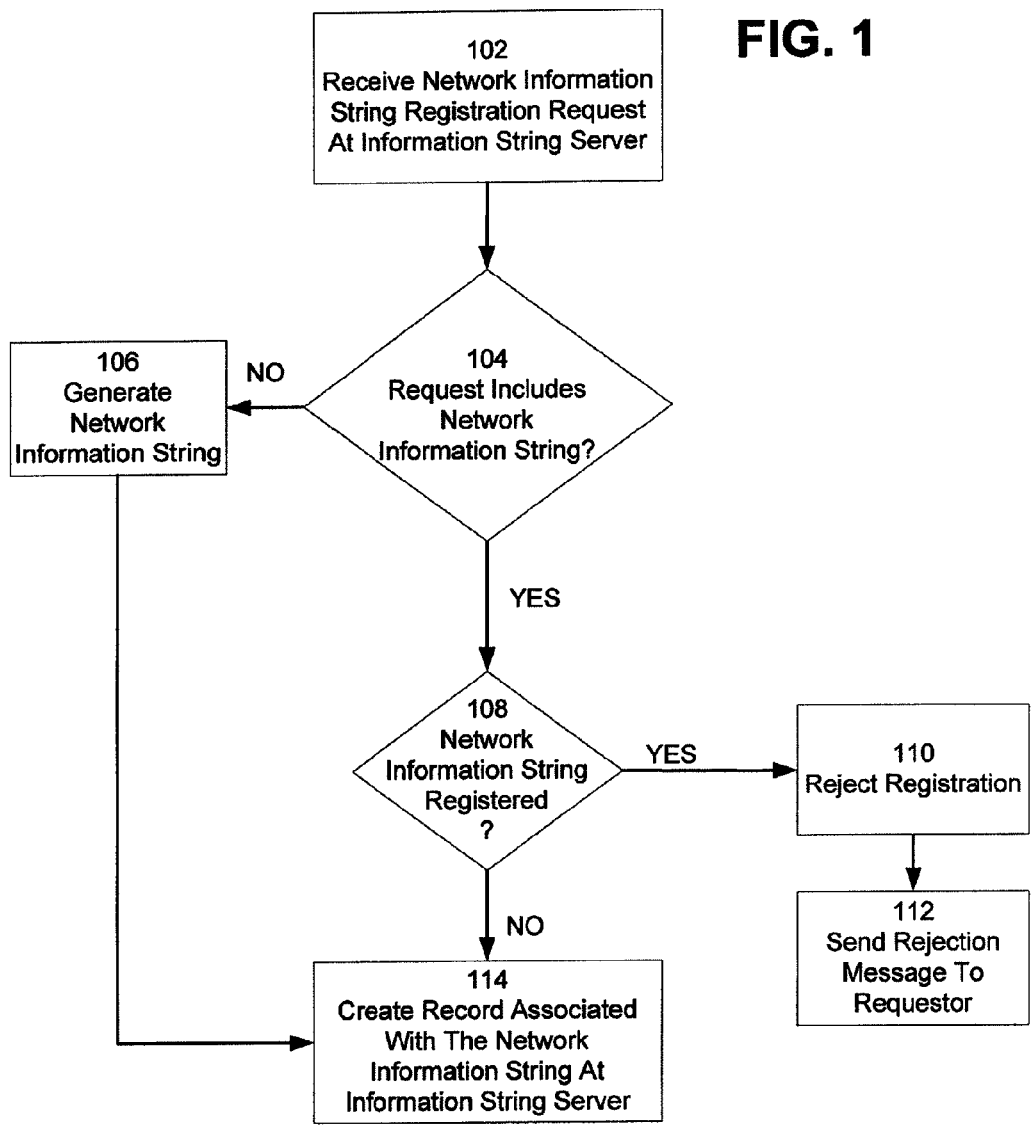
FIG. 1 is a flow diagram illustrating a process by which a network information string may be registered with an information string server according to an embodiment.

Embodiments are directed to utilizing the information broadcast by a string broadcast station (SBS) to identify a physical location to which other information may be pinned. The pinned information may be used by applications to take an action or to inform users of those applications about additional information that may be associated with or derived from the pinned information. Embodiments are also directed to associating content with a network identifier of a wireless network, storing the associated content on a server, and providing access to the content to wireless stations based on the network identifier.

Various embodiments are described in the context of a Wi-Fi network. The description is intended to be illustrative only and not limiting. Wireless networks that utilize a network identifier that is broadcast in a message frame (for example and not as a limitation, an 802.11 management frame) either by a string broadcast station or by a wireless station may be used to convey the network information strings and to facilitate the association of content, which may be entirely unrelated to network operation, as described below. For example, wireless networks may include RFID networks, Zigbee networks, Bluetooth networks and 3G/4G networks.

As used herein, a string broadcast station or "SBS" encompasses a device that is capable of broadcasting a beacon message and includes devices that are configured to provide connectivity to a network, not so configured and not capable of providing connectivity to a network.

As used herein, a "beacon message" encompasses a signal transmitted by a base station or an SBS of a wireless network that may be received by a wireless station, which signal conveys a message that identifies the network and provides information about the network, including information to allow a wireless station to join the network.

As used herein, a "probe message" encompasses a signal transmitted by a wireless station that may be received by a wireless station or an SBS, which signal conveys a message that identifies the wireless station and requests information about a particular wireless network or all wireless networks within range of the wireless station.

As used herein, a network information string encompasses a character string that is included in a beacon message broadcast by an SBS or in a probe message broadcast by a wireless station. In an embodiment, the network information string may encompass all or a portion of the network identifier broadcast by the SBS, such as for example and not as limitation, a service set identifier (SSID) of a Wi-Fi network, the MAC address broadcast by the SBS, or the MAC address in combination with all or part of the network identifier.

As used herein, a "server" encompasses a computing device comprising at least one processor that may be configured to interact in an automated fashion with other devices over a network to serve content and web pages, to issue responses to communications from other network devices and to respond to queries from other network devices.

As used herein, a "gateway" encompasses a computing device that may be configured to provide connections between different networks, including connections between a single "outside network" and multiple "inside networks."

FIG. 1 is a flow diagram illustrating a process by which a network information string may be registered with an information string server according to an embodiment.

In an embodiment, a wireless network, such as for example and without limitation a Wi-Fi network, broadcasts a message, such as a beacon message, that includes a network identifier, such as a service set identifier (SSID). All or part of the network identifier may represent a network information string. In this embodiment, a network information string registration request is received at an information string server. (Block 102.) A determination is made whether the request includes a network information string. (Block 104.) If the request does not include a network information string (the determination at Block 104 is "No"), a network information string may be generated by the information string server (Block 106), and the process continues at block 114 (described below).

If the request includes a network information string (the determination at Block 104 is "Yes"), a determination is made whether the requested network information string has been previously registered. (Block 108). In an embodiment, the determination as to whether a network information string has been previously registered may be based on matching all of a previously registered network information string or a portion of the previously registered network information string.

If the network information string has been previously registered (the determination at Block 108 is "Yes"), the registration request is rejected. (Block 110.) A message is sent advising the requestor that the registration request has been rejected. (Block 112.) In an embodiment, the rejection message may include one or more available network information strings. If the network information string has not been previously registered (the determination at Block 108 is "No"), the registration request is granted.

Upon either the generation of a network information string (Block 106) or the granting of a requested network information string (Block 108), a record is created at the information string server associated with the network information string. (Block 114.) The requestor may be required to present credentials to the information string server prior to presenting a request to register the network information string. For example, the requestor may be required to first obtain a user ID and password from the information string server or from an authentication server utilized by the information string server.

As indicated previously, the network information string may include all or a portion of a network name identifier, all or a portion of a MAC address of a string broadcast station that will broadcast the network information string in a beacon message, or a combination of a network name identifier and a string broadcast station MAC address.

In an embodiment, the network information string includes all or part of the network name identifier and may be registered in association with one or more MAC addresses. For example, a single network information string based on the network name identifier may be registered in association with the MAC addresses of multiple string broadcast stations. The string broadcast stations may be used in different locations. As discussed in detail below, the association of the network information string with the string broadcast station MAC address allows information to be associated with a network information string that is specific to that particular SBS.

Figure 2:
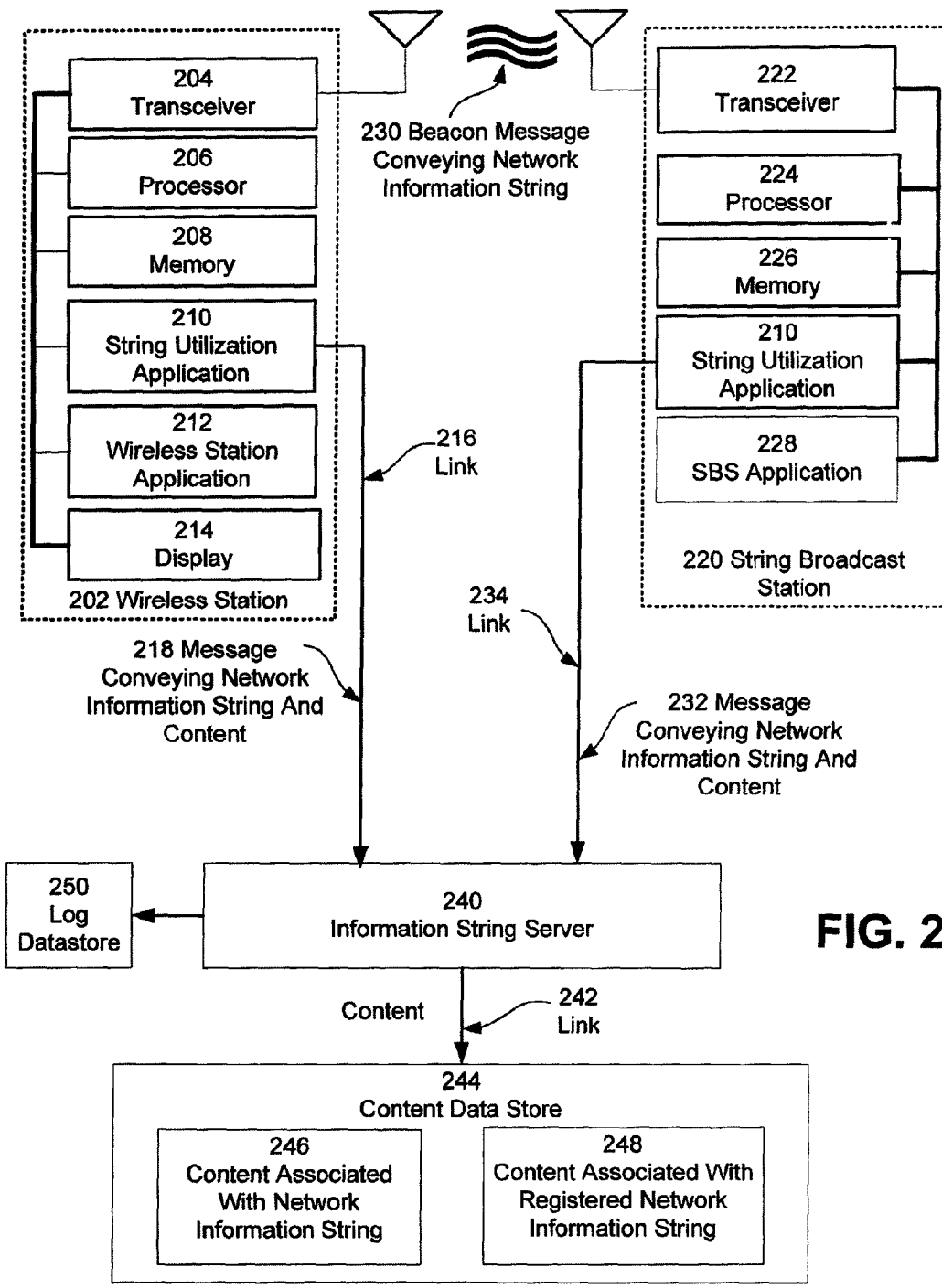
FIG. 2 is a flow diagram illustrating a process by which content associated with a network information string may be stored in a datastore according to an embodiment.

FIG. 2 is a flow diagram illustrating a process by which content associated with a network information string may be stored in a datastore according to an embodiment.

In an embodiment, content, or a link to content, may be stored in the record associated in a datastore in association with the network information string. Content may be stored by either the operator of the SBS and/or by a user of a wireless station. By way of illustration and not by way of limitation, the content may include coupons, announcements, menus, news alerts, messages, photos, directions or links to additional content on other servers.

A wireless station 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the string broadcast station (SBS) 220, such as for example and without limitation a Wi-Fi string broadcast station, as is known in the art.

In an embodiment, an SBS 220 comprises a transceiver 222, a processor 224, a memory 226, and an SBS application 228. The SBS 220 also operates an instance of the string utilization application 210. The SBS application 228 provides instructions to the processor 224 of the SBS 220 to enable the SBS 220 to at least enable the SBS 220 to transmit beacon message 230.

In an embodiment, the SBS 220 broadcasts a beacon message 230 that includes a network information string. The network information string may be an SSID or a portion of an SSID as previously described.

Content may be delivered to, and stored in, a content datastore 244 by either the operator of the SBS 220 and/or the user of the wireless station 202. The content datastore 244 is illustrated as supporting two records. The record 246 allows content to be stored in association with a network information string without regard to the ownership of the registration of the network information string. Thus, the operator of the SBS 220 or the user of the wireless station 202 may submit content to the content datastore for association with a network information string and the content will be stored in the record 246. The record 248 is reserved for storage of content by a registered owner of a network information string.

In an embodiment, an operator of the SBS 220 may send a message 232 over a link 234 conveying content or a link to content and the network information string to the information string server 240. The information string server stores the content or the record 246 in the content datastore 244 associated with the network information string or in record 248 if the network information string has been registered by the operator of the SBS 220. The content may be associated with a network information string rule allowing delivery of the content during a particular time period. For example, a business may operate an SBS. The additional content scheduled for evening and night hours may indicate nightly specials, a message that the business is currently closed, or other time-sensitive information. During those specific time periods, potential customers may be directed to the business's website for more information.

In another embodiment, the additional content is stored in a record of the information string server 240 in association with the MAC address of an SBS. The MAC address may also be used in combination with the network information string or alone. The association of an SBS MAC address with a network information string allows the record 246 or the record 248 to store content that is specific to a particular SBS. When information is requested from the content data store 244, the MAC address may be included in the request. In this way, the content that is returned is specific to an SBS and the area that is served by that SBS. For example, a network information string may be used by the operator of a business that has multiple locations each with its own SBS. The operator may elect to issue a coupon for one location only. By tying the coupon to the MAC address of that specific SBS, the coupon will be served only when a request for content (described below) includes both the network information string and the correct MAC address.

In another embodiment, content is provided by a user of a wireless station, such as for example and without limitation a Wi-Fi enabled device. In this embodiment, a beacon message 230 is received at the wireless station 202 operating the string utilization application 210. By way of illustration and not by way of limitation, the wireless station 202 may be a cell phone, a smart phone, or a laptop computer. The string utilization application 210 may be utilized to receive or create content for association with the network information string broadcast by the SBS 210. The string utilization application 210 creates a message 216 conveying the content and the network information string, and optionally, the MAC address of the SBS 210 that transmitted the beacon message 230, to the information string server 240 via link 216. The content datastore 244 stores the content in association with the network information string in a record 246 that is associated with the network information string supplied in the message. When the SBS MAC address is included in the message 216, the content is stored in association with both the network information string and the MAC address. The MAC address may be used to establish a general location of the SBS 210, width location may be used in certain messages. For example, an operator of a wireless station may leave a message to gather at a location proximate to the location of the SBS 220 that broadcasts a particular network information string. As another example, the operator of a wireless station may also leave comments about a venue that is proximate to the location of the SBS 220 that broadcasts a particular network information string, such as feedback or a review of their products or services.

In an embodiment, the owner of the network information string has privileges that allow it to control the content in both record 246 and record 248. For example, the registered owner of a network information string may remove some or all of the content in record 246 that is associated with the registered network information string. A registered owner may also block the association of content to the registered network information string except by the registered owner.

As illustrated in FIG. 2, the content datastore 244 is physically separate from the information string server 240. In this configuration, the content data store 244 may be located on a server that is accessible to the information string server 240 via a link 242 and to the wireless station 202 via the link 216. In another embodiment, the content datastore 242 is a component of the information string server 240 and the content datastore 244 is served by the information string server 240 to the wireless station 202 via the communication link 216.

Requests to share content may be logged in the log datastore 250. The logged data may include identifying information of the wireless station 202, identifying information of the user of the wireless station 202, the network information string associated with the requested content, the time when the request for content was made and the location of the wireless station when the request for content was made. The logged data captured in log datastore 250 may be used to identify user preferences, determine the response of the user of the wireless station 202 to the content 234 associated with the network information string, and measure the interest of the user of the wireless station 202 in types of content.

In another embodiment, content is stored in a memory of a wireless station, such as, for example and without limitation, memory 208 of wireless station 202. By way of illustration and not by way of limitation, the content may be stored in memory 208 of the wireless station 202 at the direction of a user of the wireless station 202, by virtue of the configuration of string utilization application 210, or in response to the acquisition of content by the wireless station 202 from the content datastore 244 (acquisition of content from the content datastore 244 is discussed in detail below). For example, a user may configure a wireless station to play an audio file when in proximity to an SBS that is broadcasting a network information string that includes the word "coffee." The string utilization application 210 may also acquire content (for example, a coupon for a pastry) in response to receipt of a network information string from a first SBS that includes the word "coffee," wherein the coupon is presented when the wireless station receives a network information string (for example, "helen's cakes") from a second SBS.

Content Acquisition

Figure 3:
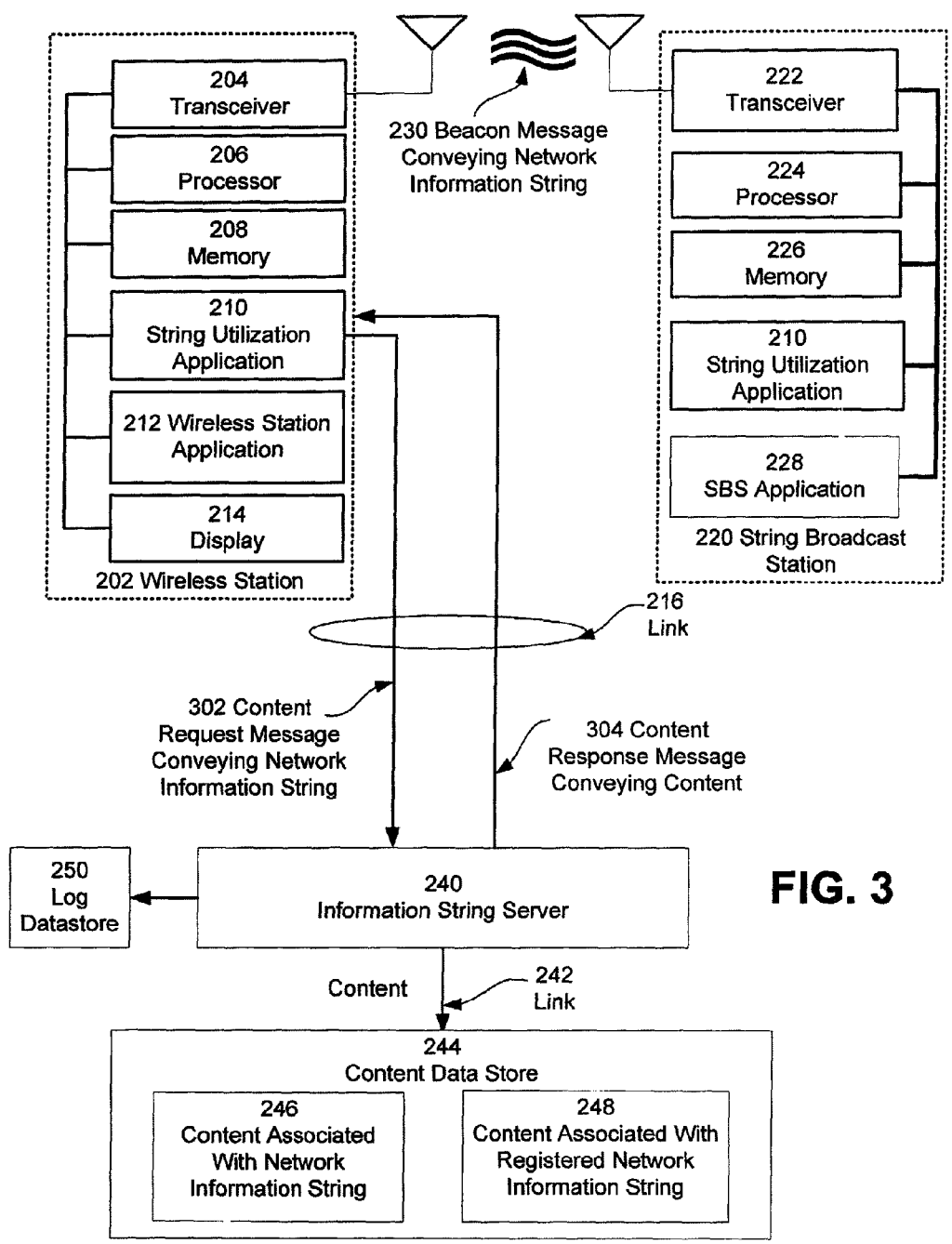
FIG. 3 is a block diagram illustrating the acquisition of content associated with a network information string according to an embodiment.

FIG. 3 is a block diagram illustrating the acquisition of content associated with a network information string according to an embodiment.

A wireless station 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the SBS 220 as is known in the art.

In an embodiment, an SBS 220 comprises a transceiver 222, a processor 224, a memory 226, and SBS application 228. The SBS 220 also operates an instance of string utilization application 210. The SBS 228 provides instructions to the processor 224 of the SBS 220 to at least enable the SBS 220 to transmit beacon message 230.

In an embodiment, the SBS 220 broadcasts a beacon message 230 that includes a network information string that is associated with content stored on the information string server 240. The network information string may be associated with content stored in a record 246 or 248 held on content data store 244. The beacon message 230 may also include the MAC address of the SBS 220. In an embodiment, the SBS 220 provides wireless stations that associate with SBS 220 access to a network (not illustrated). In another embodiment, the SBS 220 is configured to broadcast beacon message 230 but is not configured to provide network access. In another embodiment, the SBS 220 not capable of providing connectivity to a network.

A wireless station 202 is configured with a string utilization application 210 to be executed by processor 206. By way of illustration and not by way of limitation, the wireless station 202 may be a cell phone, a smart phone, a laptop computer, a vending machine or a cash register.

The wireless station 202 may receive one or more beacon messages, including beacon message 230. In an embodiment, the string utilization application 210 examines the network identifier of each beacon message to determine if the network identifier contains a network information string included on a network information string list stored in a memory accessible to the wireless station 202, such as memory 208. When the string utilization application 210 receives a listed network information string, the string utilization application 210 may check a memory accessible to the wireless station 202, such as memory 208, for content that is associated with the network information string. If the content is not found in the memory accessible to the wireless station 202, the wireless station 202 may send a content request message 302 that includes the network information string to the information string server 240 via link 216.

Alternatively, the string utilization application 210 passes the network identifier from each beacon message to the information string server 240 for inspection without first examining the network information string. The information string server 240 examines the network identifier of each beacon message to determine if the network identifier contains a network information string associated with content stored in a data stored device accessible to information string server 240, such as content datastore 244.

As previously described, the network information string may include all or a portion of the network identifier (e.g., the SSID) that is broadcast by the string broadcast station 220. For example, a coffee shop chain may assign the SSIDs joesjava1, joesjava2 . . . joesjava[n] to its "n" shops. It may register the network information string "joesjava" to provide the same message to all of its patrons regardless of which shop a patron is visiting. It may also register joesjava[n] in association with string broadcast station MAC addresses to provide messages on a per-shop basis.

In another embodiment, the acquisition of content is based at least in part on the MAC address of the string broadcast station 220 that is included in the beacon message 230. In this embodiment, the MAC address may be associated with the network information string and with the content on the content datastore 244. The MAC address may be used to acquire content that is specific to a particular venue at which the SBS 220 is located.

The content request message 302 may also include credentials of the user of the wireless station 202. The credentials are evaluated by the information string server 240 prior to responding to a request to obtain content from the information string server. For example, the requestor may be required to first obtain a user ID and password from the information string server or from an authentication server utilized by the information string server. In an embodiment, the string utilization application 210 operating on the wireless station 202 may be configured to present the credentials required to access the information string server 240. In another embodiment, the user of the wireless station 202 may establish a session of a fixed time period with the information string server 240 by presenting the required credentials to the information string server 240.

The information string server 240 responds by sending a content response message 304 to the wireless station 202 via the link 216. By way of illustration and not by way of limitation, the additional content may include coupons, announcements, menus, news alerts, photos, directions or links to additional content on other servers. As illustrated in FIG. 3, the content datastore 232 is physically separate from the information string server 240. In this configuration, the content datastore 244 may be located on a server that is accessible to the information string server 240 via a link 242 and to the wireless station 202 via the link 216. In another embodiment, the content datastore 244 is a component of the information string server 240 and the content is served by the information string server 240 to the wireless station 202 via the link 216.

The wireless station 202 communicates with the information string server 240 and receives content from the content datastore 232 via a communication link 216. The link 216 may be a wired link, a wireless link that is provided via a cellular network or a wireless link that is provided over a variety of wireless protocols. Alternatively, the link 216 may be provided wirelessly through a gateway (not illustrated) that connects a wireless network to a wired network such as the Internet. The wireless portion of the link may be provided through string broadcast station 220 or through another string broadcast station (not illustrated).

Requests for content may be logged in the log datastore 250. The logged data may include identifying information of the wireless station 202, identifying information of the user of the wireless station 202, the network information string associated with the requested content, the time when the request for content was made, and the location of the wireless station when the request for content was made. The logged data captured in log datastore 250 may be used to identify user preferences, determine the response of the user of the wireless station 202 to the content associated with the network information string, and measure the interest of the user of the wireless station 202 in types of content.

Embodiments hereof allow a message to be addressed to any wireless station that enters the range of a beacon signal sent by an SBS. Cell phones, smart phones, laptop computers, automated software, vending machines and cash registers can perform the functions using the system of the invention. The messages may convey marketing information, public service information, traffic information, instructions for persons with disabilities, sports scores, weather information, time schedules, and emergency instructions among other information. The messages may be displayed as text, images or audio or a combination of the same.

Listener Module

Figure 4:
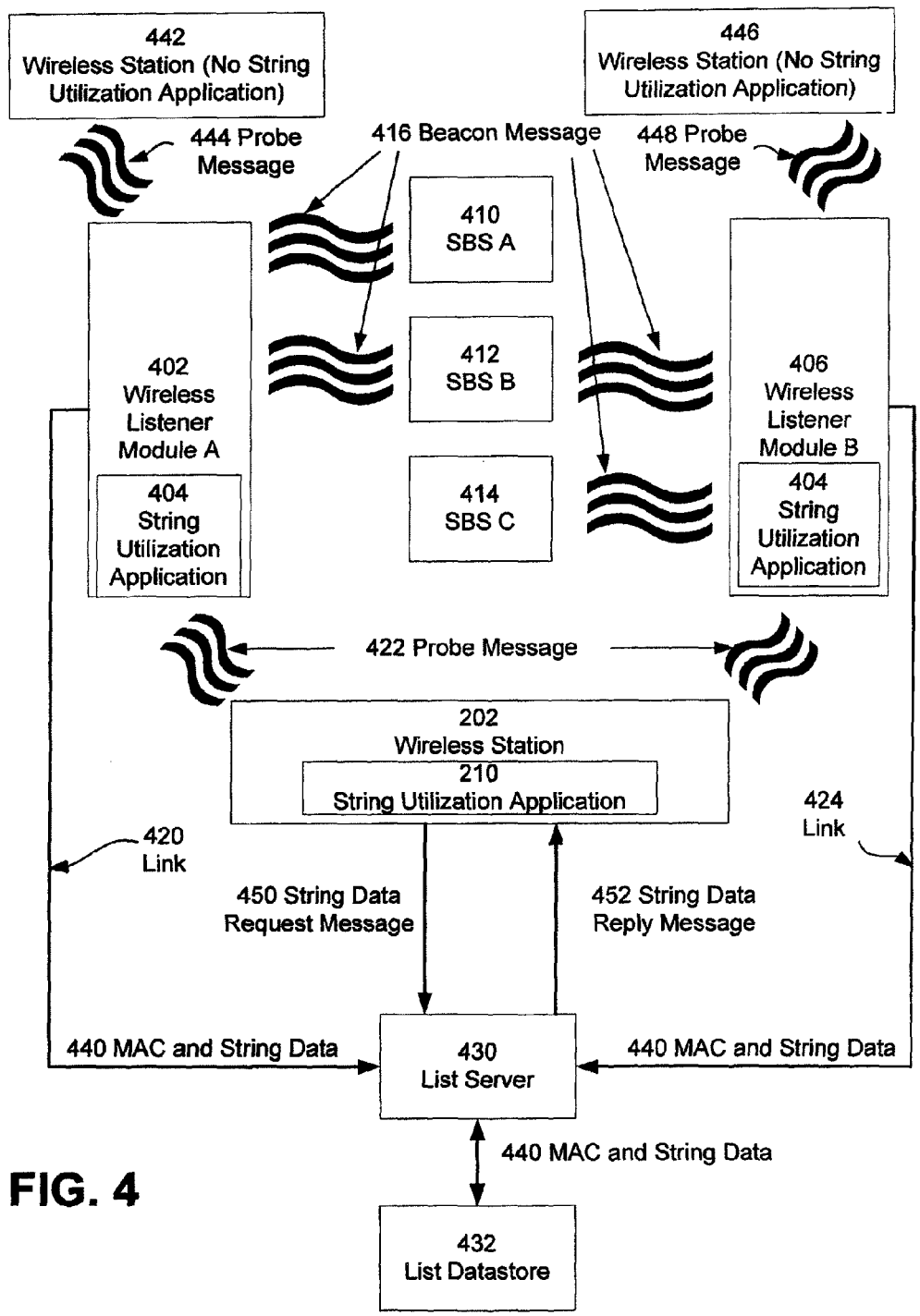
FIG. 4 is a flow block illustrating operations performed by a listener module according to an embodiment.

FIG. 4 is a block diagram illustrating operations performed by a listener module according to an embodiment.

Wireless listener module A and B (elements 402 and 406) are configured to listen for beacon messages 416 transmitted by string broadcast stations, such as SBS A, SBS B and SBS C (elements 410, 412 and 414). In an embodiment, an SBS beacon message 416 comprises a network information string. A wireless listener module (elements 402 and 406) operating a string utilization application (element 404) receives one or more beacon messages 416 and obtains the network information string from each received beacon message. The wireless listener modules (elements 402 and 406) also receive a probe message 422 from a wireless station 202. The probe message includes the media access controller (MAC) address of the wireless station 202. Wireless station 202 operates string utilization application 210. In another embodiment, wireless listener module 402 also receives probe message 444 from wireless station 442. The probe message 444 includes the media access controller (MAC) address of the wireless station 442. Wireless station 442 does not operate an instance of the string utilization application 210. Similarly, wireless listener module 404 also receives probe message 448 from wireless station 446. The probe message includes the MAC address of the wireless station 446. Wireless station 446 also does not operate an instance of the string utilization application 210. Thus, a wireless listener modules receive probe and beacon messages from wireless stations and SBSs that are within range of the wireless listener module.

In an embodiment, a wireless listener module, such as module A and B, may also be configured to operate as an SBS and broadcast an SBS beacon message that comprises a network information string.

In an embodiment, a wireless listener module, such as wireless listener module A, 402 associates the MAC address of the wireless station 202, the MAC address of wireless station 442, the MAC address of wireless station 444 and the MAC address of listener module A with the network information strings received from each beacon message 416 and sends the information strings and the MAC addresses to a list data server 430 for storage in a listener datastore 432. The wireless listener module A 402 may also provide a timestamp that indicates when the wireless station 202 was proximate to the listener module A 402.

As illustrated in FIG. 4, wireless listener module A 402 connects to the list data server 430 via a link 420 and wireless listener module B 406 connects to list data server 430 via link 422. The links 420 and 422 may be wireless links, such as via a wireless LAN or a wireless telephone network, or may be a wired link, such as via DSL line, a cable network, or a fiber network. In another embodiment, wireless listener modules A 402 and B 406 communicate with each other and other wireless listener modules via a mesh network (not illustrated).

Using an instance of the string utilization application 210, the wireless station 202 may send a string data request message 450 for a list of network information strings proximate to its current location from the list server that have been reported by one or more listener modules, such as wireless listener module A 402, that have also detected the probe message and the MAC address of the wireless station 420. The string data request message 450 includes the MAC address of the wireless station 202. The list server 440 may respond to the string data request message by acquiring a list of network information strings associated with the MAC address of the wireless station 202 from the listener datastore 432 and sending the list to the wireless station 202 in string data response message.

In an embodiment, a wireless listener module, such as wireless listener module A 402, may listen for probe messages periodically. The time of receipt of a probe message 422 is captured by a time stamp. When a wireless station moves out of range of the wireless listener module A 402, the elapsed time between a current time and the time indicated by a last time stamp will increase. This elapsed time period may be used by the datastore 442 to measure the age of data relating to a MAC address and to log data (for example, MAC address and associated network information strings) to the listener datastore 432 or to delete data of a particular age.

While FIG. 4 illustrates two listener modules A and B, the illustration is not limiting. Any number of listener modules may be deployed in a physical space to form a listener network. Because the location of each listener module within the listener network is known, the location of a wireless station that broadcasts a probe message (without regard to whether the wireless station operates a string utilization application) may be tracked within the listener network. Time stamping of the receipt of probe messages by each listener module within the listener network allows the presence, path, time at location, number of visits to a location, and other metrics to be determined on a per wireless station basis. Additionally, the tracking data may be used to construct reports. For example, the tracking data may indicate that 3,000 wireless station passed by a particular listener module during a single day and that 78% of these also passed by the listener module the previous day. The tracking data may be of interest to city planners, businesses and public safety officials. For example, traffic outside a potential terrorist target could be monitored to determine if the behavior of a particular wireless station is suspicious.

FIG. 4 illustrates a list data server 430 and a listener datastore 432. In an embodiment, these structures are components of information string server 240 (see, FIG. 2).

In another embodiment, a listener module, such as listener module A (402) receives probe messages from the wireless station 202 and communicates content to the wireless station 202 directly.

Commanding Software Applications

Figure 5A:
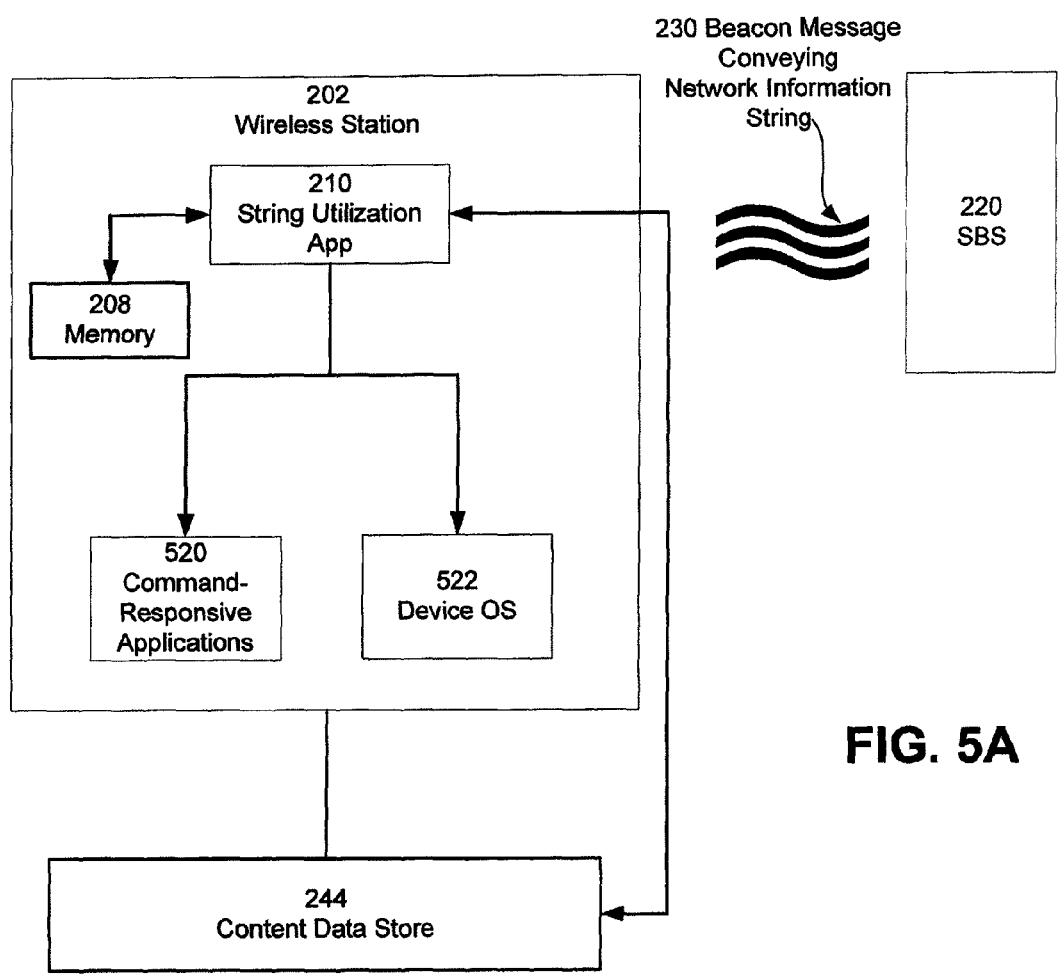
FIG. 5A is a block diagram illustrating the operation of a wireless station in response to receipt of a network information string according to an embodiment.

FIG. 5A is a block diagram illustrating the operation of a wireless station in response to receipt of a network information string according to an embodiment. (Note that FIG. 5A illustrates only a limited number of structural elements for the ease of discussion. See, FIGS. 2 and 3.) In an embodiment, a wireless station 202, such as, for example and without limitation a Wi-Fi enabled device, is configured with a string utilization application (string utilization application) 210 executed by processor 206 (not illustrated). By way of illustration and not by way of limitation, the wireless station 202 may be a cell phone, a smart phone, a laptop computer, a vending machine or a cash register.

The memory 208 and the content datastore 244 may include a list of network information strings that are associated with command codes, which list is accessible to string utilization application 210. The wireless station 202 may receive one or more beacon messages, including beacon message 230, from the string broadcast station 220. The string utilization application 210 examines the network identifier (for example and not as a limitation, an SSID) of each beacon message. In an embodiment, the string utilization application 210 may determine if the network identifier contains a network information string on the command code list stored in memory 208. Alternatively, the string utilization application 210 may forward a received network information string to information string server 240 (not illustrated). The string server 240 may respond with content that is stored in content datastore 244 that includes a command code.

When the string utilization application 210 receives a listed network information string associated with a command code that is stored in memory 208 or content datastore 244, the string utilization application 210 refers the listed command code to a command-responsive application 520 or to the operating system 522 of the wireless station. The command-responsive application 520 and the operating system 522 may be configured to take an action in response to the receipt of the command code. For example, the command-responsive application 520 may be a browser that is configured to open a particular web page in response to a particular command code. The device operating system 522 may be configured to load a command-responsive application 520 from memory or to download a command-responsive application from the Internet. Other actions may include displaying a reminder message or playing audio content.

Figure 5B:
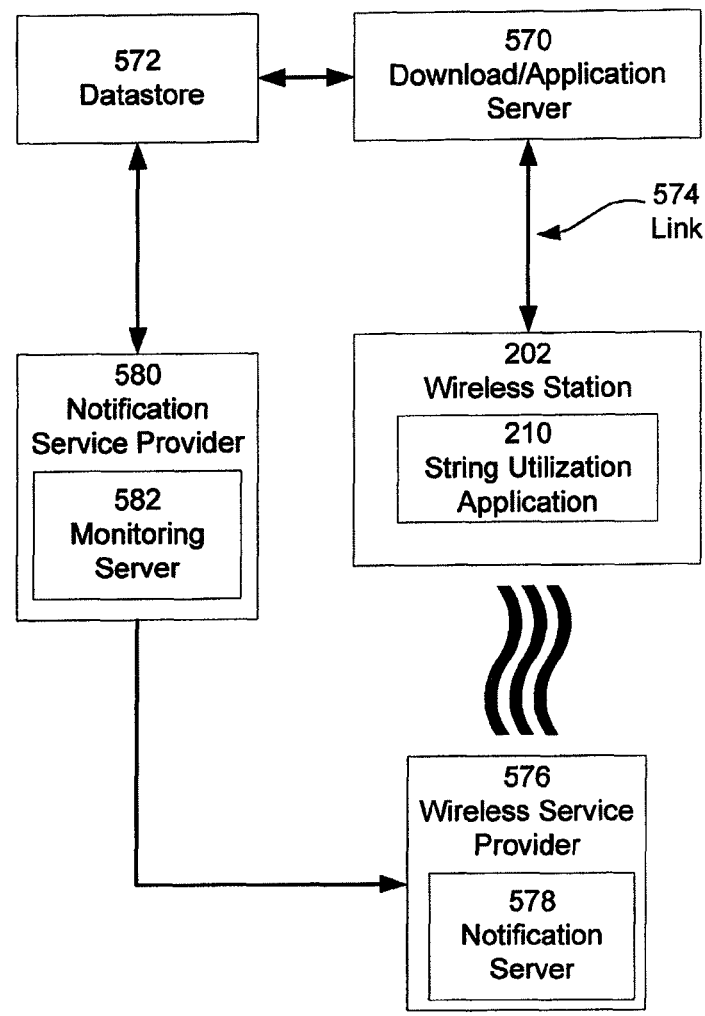
FIG. 5B is a block diagram illustrating a process for triggering a wireless station to take an action according to an embodiment.

FIG. 5B is a block diagram illustrating a process for triggering a wireless station to take an action according to an embodiment. In an embodiment, the string utilization application 210 is downloaded from a download/application server 570 to a wireless station 202 that receives wireless services from a wireless service provider 576. During the installation process, the download/application server 570 acquires wireless station information, including its MAC address and a unique token, and user information and stores the station and user information in a datastore 572. The wireless station 202 may be configured to receive a notification from the wireless service provider and to initiate a response based on this notification. In an embodiment, the string utilization application 210 is configured by a listener service provider 580 to respond to the receipt of the notification in a particular way.

In an embodiment, the notification service provider 580 monitors one or more wireless listener modules, such as wireless listener module A 402 as illustrated in FIG. 4, via a monitoring server 582. When the presence of the wireless station 202 is detected in proximity to a particular wireless listener module, the monitoring server 582 may send a message to the wireless service provider 576 to send a notification to the wireless station 202. The message from the monitoring server 582 to the wireless service provider 576 includes the unique token associated with the wireless station 202. The notification service provider 576 directs notification server 578 to send the notification to the wireless station 202, based on the unique token sent from the monitoring server. The receipt of the notification by the wireless station 202 conveys a location-relevant instruction to the string utilization application 210 operating on the wireless station 202. By way of illustration and not by way of limitation, the instruction may cause the wireless station 202 to download a coupon for a nearby merchant, render content, operate an application, connect to a website, etc.

Figure 6:
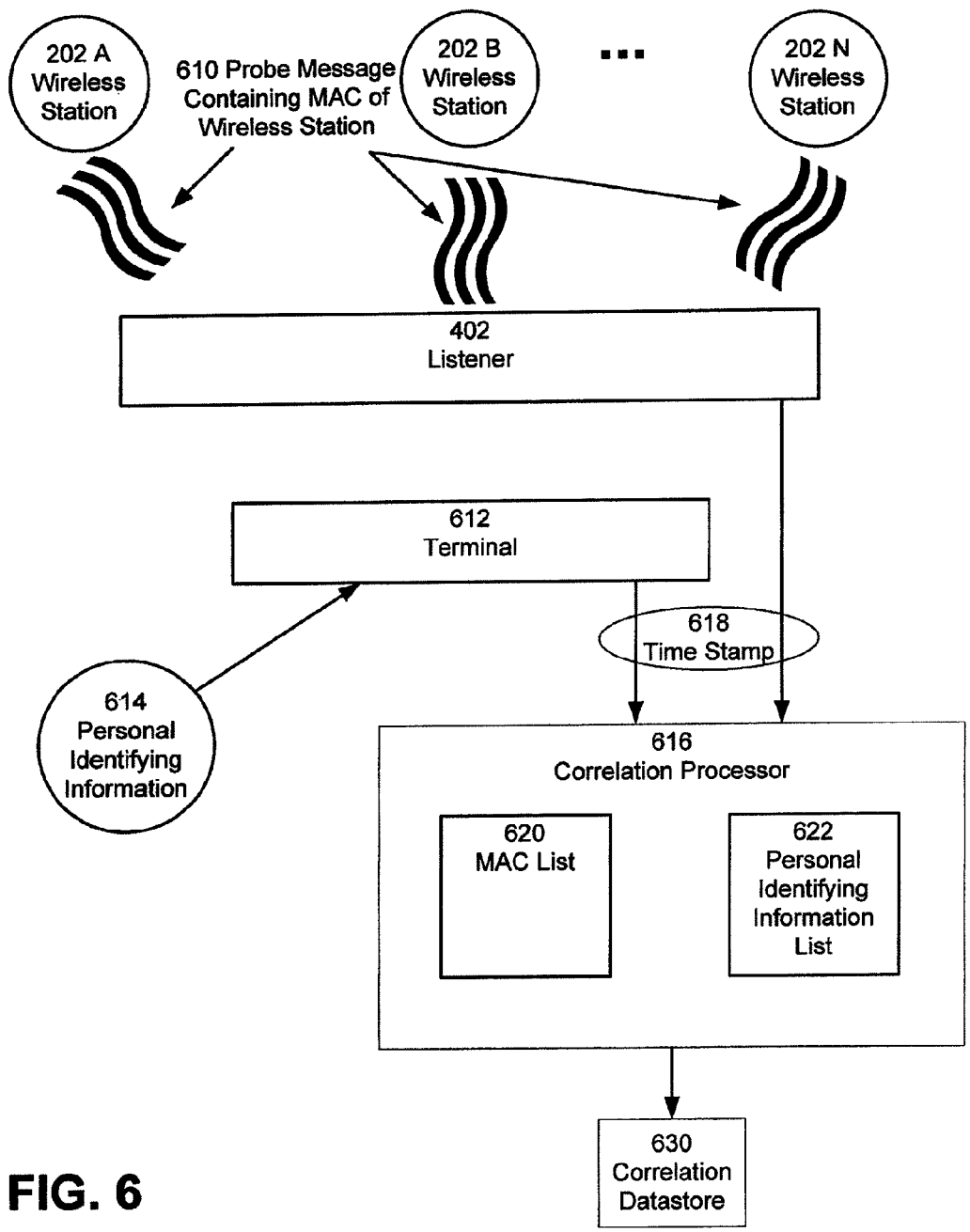
FIG. 6 is a block diagram illustrating a process by which a MAC address of a wireless station may associated with user identifying information according to an embodiment.

FIG. 6 is a block diagram illustrating a process by which a MAC address of a wireless station may associated with personal identifying information according to an embodiment.

In an embodiment, a wireless listener module (such element 402) receives probe messages 610 from multiple wireless stations 202A through 202N. The probe messages from the wireless stations include the media access controller (MAC) address of the wireless station broadcasting the probe message.

A terminal 612 is configured to receive personal identifying information 614 in the course of a transaction, such as, for example, a transaction that involves the presentation of a loyalty card. The personal identifying information 614 may take the form of an identifier, such as a loyalty card number, or it may include the name, address and other information about the loyalty card holder.

A correlation processor 616 may generated a list of MAC addresses 620 from probe messages collected by the listener 402 over a particular time period and a list of personal identifying information 622 collected over the same time period from the terminal 612. In an embodiment, the time that the personal identifying information 614 is acquired and the time a probe message 610 is received are recorded by time stamp device 618.

A deductive process may be used by correlation processor 616 to filter the MAC address list 620 to associate a particular MAC address with an particular individual's personal identifying information. The time stamp of multiple occurrences of the personal identifying information 614 may be used to filter the list of MAC addresses to identify a MAC address of the device associated with the particular identifying information. The results are stored in a correlation datastore 630.

Once the association of the MAC address to the loyalty card number is made, the retailer may use the association to determine the location of the particular purchaser by obtaining location information associated with the MAC address of the purchaser's wireless station. The location information may be obtained by the retailer from other listener devices operated by the retailer or from a database that stores location information collected from listener devices operated by others.

Figure 7:
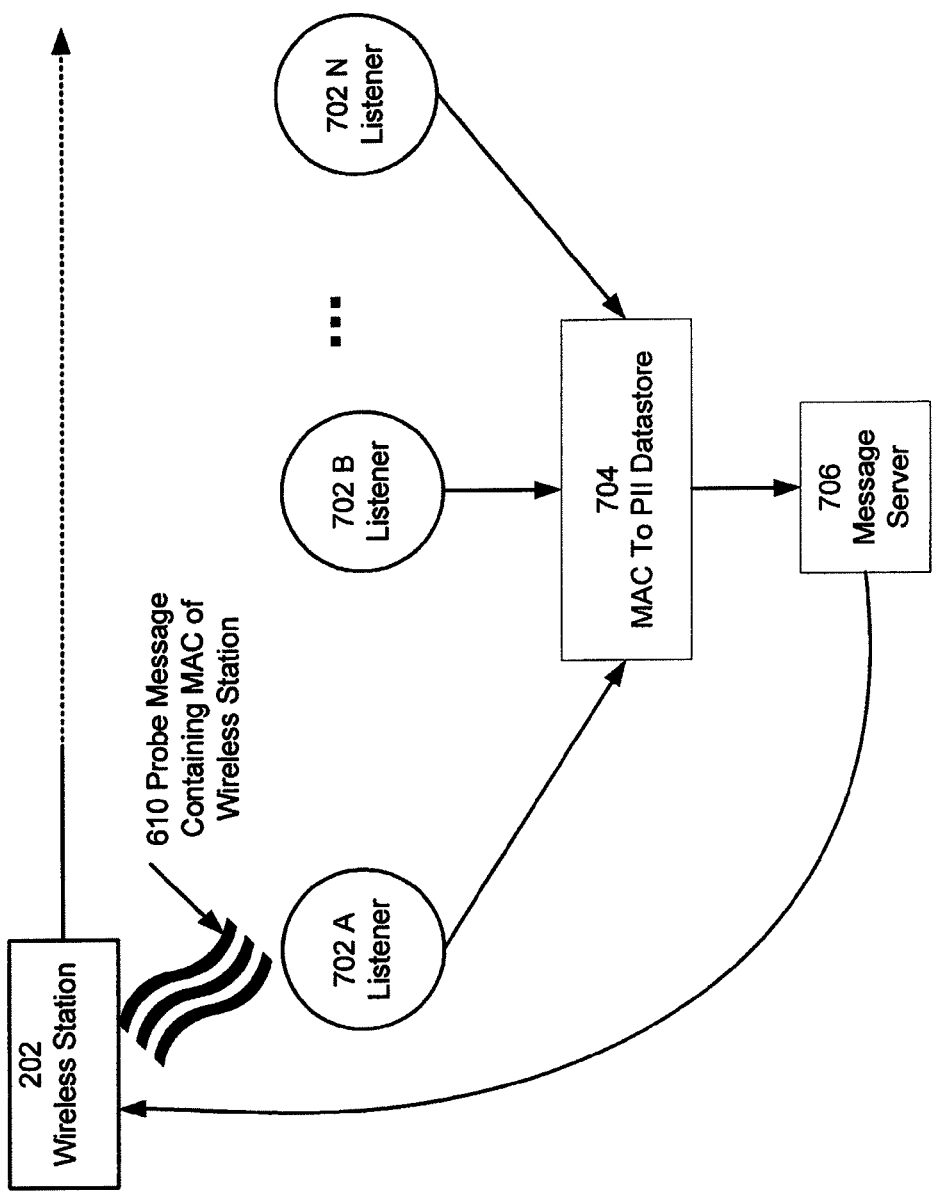
FIG. 7 is a block diagram illustrating use of a MAC address to provide messages to a wireless station according to an embodiment.

FIG. 7 is a block diagram illustrating use of a MAC address to provide messages to a wireless station according to an embodiment. A wireless station 202 is on a path that places it in proximity to one or more listener modules 702A through 702N. The listener modules may be in a retail store, a mall, or in locations of a retailer having a chain of outlets. When the wireless station comes in proximity to one of the listener modules, the listener module captures the MAC address from a probe message 610 broadcast by the wireless station 202. Using a MAC-to-personal identifying information datastore 704, a determination is made whether identifying information of the user of the wireless station 202 has been associated with the MAC address of the wireless station 202. If the association is found in the datastore 704, the location of the listener module reporting the MAC address may be used to identify the location of the wireless station 202.

In an embodiment, a message server 706 may communicate a message to the wireless station 202 based on the location of the wireless station 202 or information about the location. For example, if the location information indicates that the wireless station 202 is in a section of a store that features coffee, the message server 706 may provide the wireless station 202 information about coffee, an advertisement for a particular brand of coffee or a coupon for a sample of a particular brand of coffee.

Figure 8:
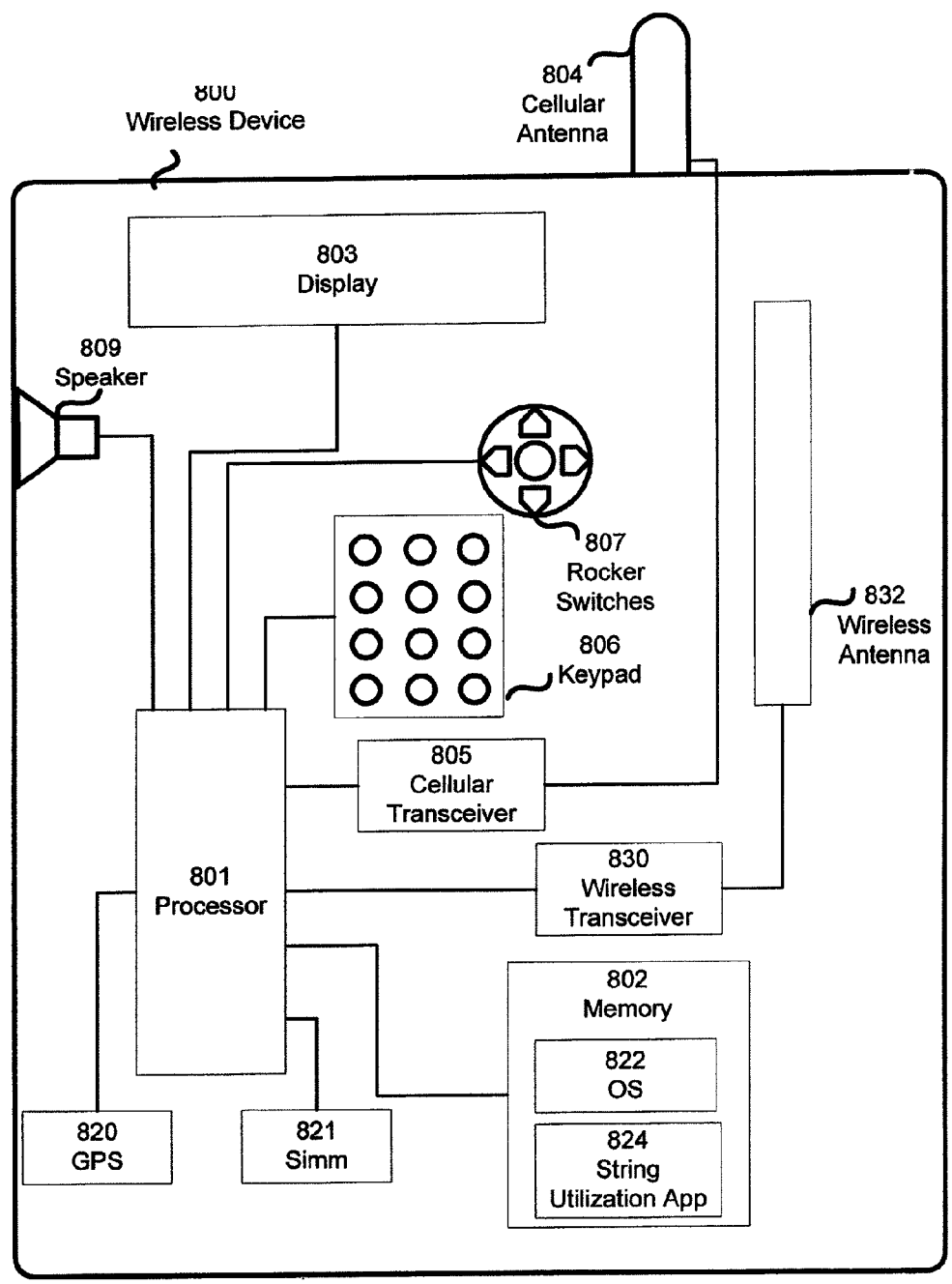
FIG. 8 is a block diagram illustrating components of a wireless station.

A wireless device suitable for use with the various embodiments is illustrated in FIG. 8.

A wireless device 800 may include a processor 801 coupled to an internal memory 802, to a display 803 and to a SIMM 821 or similar removable memory unit. Additionally, the wireless station 800 may optionally have a cellular antenna 804 for sending and receiving electromagnetic radiation that is connected to a cellular transceiver 805 coupled to the processor 801. In some implementations, the transceiver 805 and portions of the processor 801 and memory 802 may be used for multi-network communications. The wireless device 800 may also include a key pad 806 or miniature keyboard and menu selection buttons or rocker switches 807 for receiving user inputs. The wireless device 800 may also include a GPS navigation device 820 coupled to the processor and used to determine the location coordinates of the wireless device 800. Additionally, the display 803 may be a touch-sensitive device that may be configured to receive user inputs.

A wireless transceiver 830 provides wireless communications via wireless antenna 832. By way of illustration and not by way of limitation, the wireless transceiver may be compliant with 802.11x standards.

The processor 801 may be any programmable microprocessor, microcomputer or multiple processor chip or chips that can be configured by software instructions (applications) to perform a variety of functions, including the functions of the various embodiments described herein. In an embodiment, the wireless device 800 may include multiple processors 801, such as one processor dedicated to cellular and/or wireless communication functions and one processor dedicated to running other applications.

Typically, software applications may be stored in the internal memory 802 before they are accessed and loaded into the processor 801. For example, the internal memory 802 may include string utilization application 824. In an embodiment, the processor 801 may include or have access to an internal memory 802 sufficient to store the application software instructions. The memory may also include an operating system 822.

The internal memory of the processor may include a secure memory (not illustrated) which is not directly accessible by users or applications and that is capable of recording MDINs and SIMM IDs as described in the various embodiments. As part of the processor, such a secure memory may not be replaced or accessed without damaging or replacing the processor.

Additionally, the internal memory 802 may be a volatile or nonvolatile memory, such as flash memory, or a mixture of both. For the purposes of this description, a general reference to memory refers to all memory accessible by the processor 801, including internal memory 802, removable memory plugged into the computing device, and memory within the processor 801 itself, including the secure memory.

In an embodiment, additional memory chips (e.g., a Secure Data (SD) card) may be plugged into the wireless device 800 and coupled to the processor 801.

Figure 9:
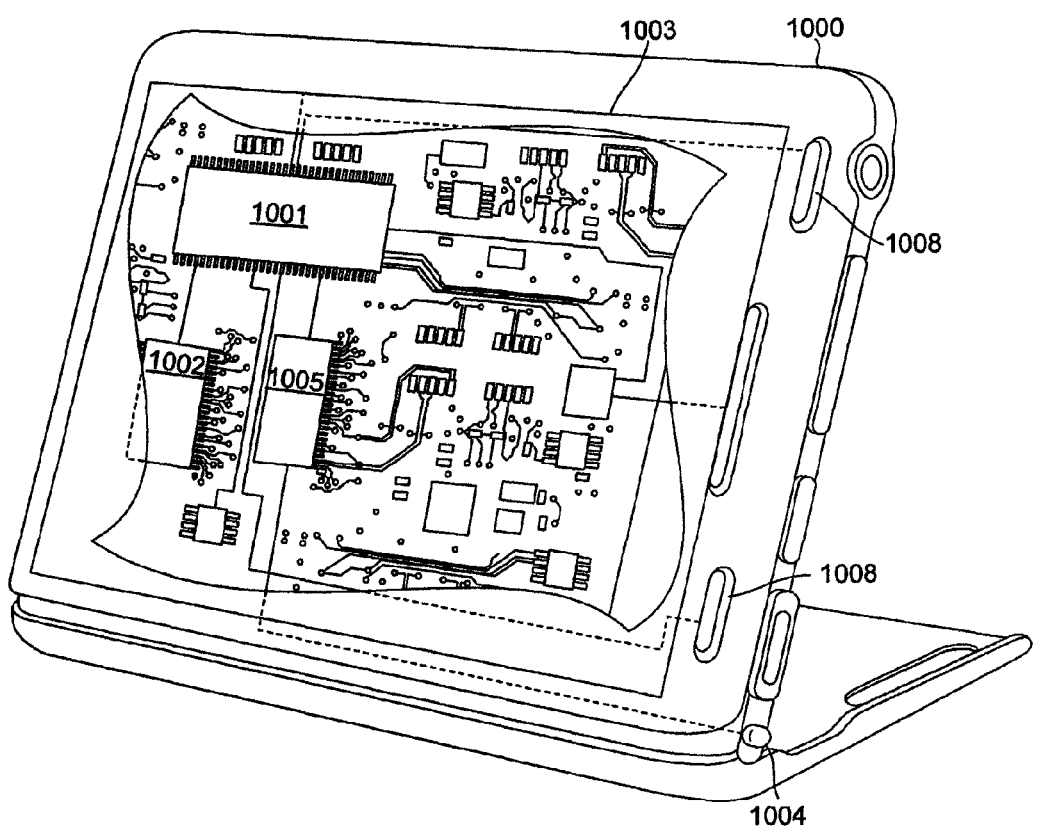
FIG. 9 is a block diagram illustrating a computing device.
Figure 10:
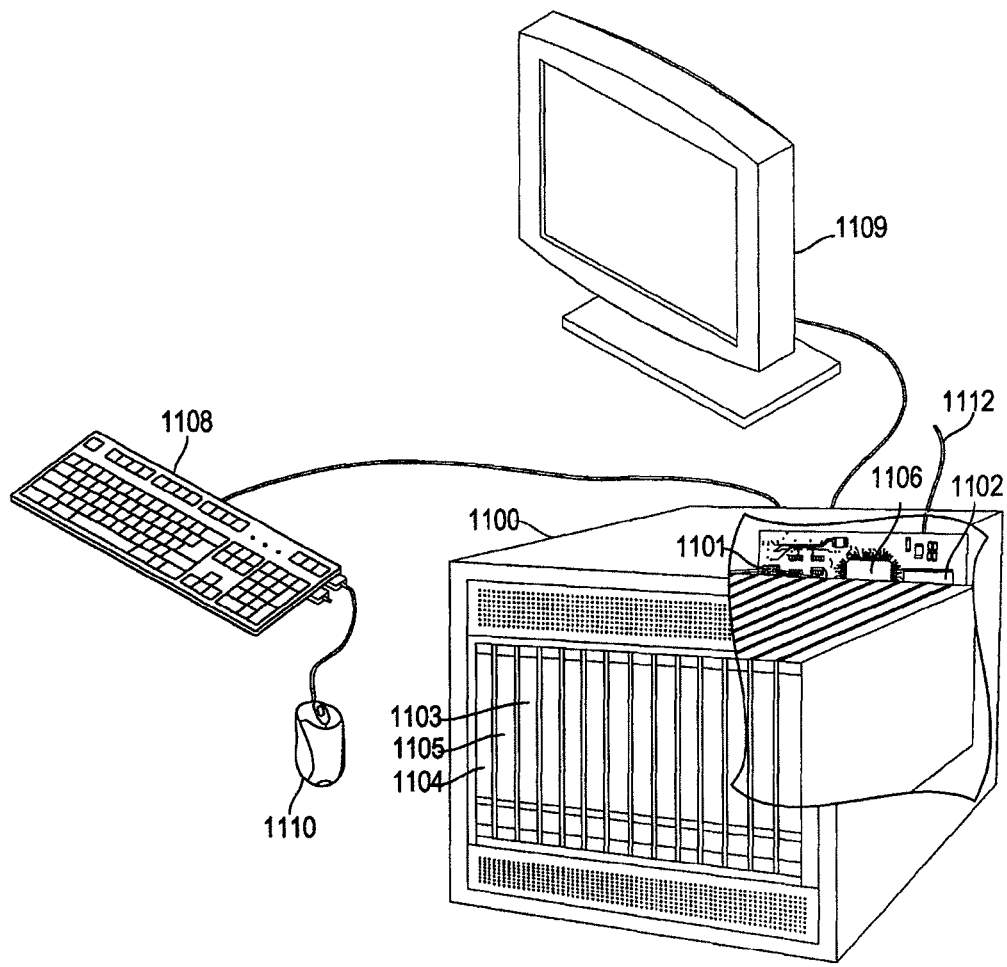
FIG. 10 is a block diagram illustrating a server device.

FIG. 9 is a system block diagram of a computing device suitable for use with various embodiments. A typical computing device 1000 may include a processor 1001 coupled to internal memory 1002, to a display 1003, and to a speaker 1008. Additionally, the computing device 1000 will include an antenna 1004 for sending and receiving electromagnetic radiation and/or data messages to and from the Internet and/or other networks. The various embodiments may also be implemented on any of a variety of commercially available server devices, such as the server 1100 illustrated in FIG. 10. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and 1103 before they are accessed and loaded into the processor 1001, 1101. The processor 1001, 1101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combination of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of managing content exchanges in a wireless network, comprising:
   receiving, by a wireless station, a message broadcast by a string broadcast station, wherein the string broadcast station message comprises a network information string associated with content stored in an information string server in association with a MAC address of the string broadcast station such that the content acquired by the wireless station corresponds to a venue at which the string broadcast station is located is stored without regard to ownership of registration of the network information string;
   generating, by the wireless station, an identifier comprising a tag component and a content component, the tag component specific to the string broadcast station;
   storing a list of personal identifying information and a list of tag components in the datastore over a specified time period;
   filtering the tag component list to associate individual tag components with individual personal identifying information; and
   identifying a location of the wireless station based on an association of the MAC address to the individual personal identifying information.

2. The method of claim 1, wherein the wireless station is selected from the group consisting of a smartphone, a tablet, a laptop computer, a Wi-Fi enabled device, a Bluetooth enabled device, and a Zigbee enabled device.

3. The method of claim 1, wherein the wireless station and the string broadcast station communicate over a wireless network selected from the group consisting of a Wi-Fi network, an RFID network, a Zigbee network, a Bluetooth network and a 3G/4G cellular network.

4. The method of claim 1, wherein the message broadcast by the string broadcast station comprises a network name identifier and wherein the network information string comprises at least a portion of the network name identifier.

5. The method of claim 4, wherein the network name identifier is a service set identifier.

6. The method of claim 1, wherein the message broadcast by the string broadcast station comprises a MAC address of the string broadcast station and wherein the network information string comprises the MAC address of the string broadcast station.

7. The method of claim 6, wherein the tag component identifies a location of the string broadcast station using the MAC address.

8. The method of claim 1, wherein the content associated with the network information string is also associated with a network information string rule allowing delivery of the content during a specified time period.

9. The method of claim 1, further comprising:
storing a list of personal identifying information and a list of tag components in the datastore over a specified time period; and
filtering the tag component list to associate individual tag components with individual personal identifying information.

10. The method of claim 1, further comprising sending the identifier and the network information string to a datastore; and
in response to sending the identifier and the network information string, storing the identifier in association with the network information string in the datastore.

11. A non-transitory computer-readable medium storing computer instructions for managing content exchanges in a wireless network, that when executed by one or more processors, causes the one or more processors to perform the steps of:
receiving, by a wireless station, a message broadcast by a string broadcast station, wherein the string broadcast station message comprises a network information string associated with content stored in an information string server in association with a MAC address of the string broadcast station such that the content acquired by the wireless station corresponds to a venue at which the string broadcast station is located is stored without regard to ownership of registration of the network information string;
generating, by the wireless station, an identifier comprising a tag component and a content component, the tag component specific to the string broadcast station;
storing a list of personal identifying information and a list of tag components in the datastore over a specified time period;
filtering the tag component list to associate individual tag components with individual personal identifying information; and
identifying a location of the wireless station based on an association of the MAC address to the individual personal identifying information.

12. The non-transitory computer-readable medium of claim 11, wherein the wireless station is selected from the group consisting of a smartphone, a tablet, a laptop computer, a Wi-Fi enabled device, a Bluetooth enabled device, and a Zigbee enabled device.

13. The non-transitory computer-readable medium of claim 11, wherein the wireless station and the string broadcast station communicate over a wireless network selected from the group consisting of a Wi-Fi network, an RFD network, a Zigbee network, a Bluetooth network and a 3G/4G cellular network.

14. The non-transitory computer-readable medium of claim 11, wherein the message broadcast by the string broadcast station comprises a network name identifier and wherein the network information string comprises at least a portion or the network name identifier.

15. The non-transitory computer-readable medium of claim 14, wherein the network name identifier is a service set identifier.

16. The non-transitory computer-readable medium of claim 11, wherein the message broadcast by the string broadcast station comprises a MAC address of the string broadcast station and wherein the network information string comprises the MAC address of the string broadcast station.

17. The non-transitory computer-readable medium or claim 16, wherein the tag component identifies a location of the string broadcast station using the MAC address.

18. The non-transitory computer-readable medium of claim 11, wherein the content associated with the network information string is also associated with a network information string rule allowing delivery of the content during a specified time period.

19. The non-transitory computer-readable medium of claim 11, the one or more processors further perform the steps of:
sending the identifier and the network information string to a datastore; and
in response to sending the identifier and the network information string, storing the identifier in association with the network information string in the datastore.

* * * * *